Dec. 1, 1942.　　　　R. J. NEWTON　　　　2,303,754
PINEAPPLE SORTING APPARATUS
Filed Dec. 20, 1939　　　2 Sheets-Sheet 1
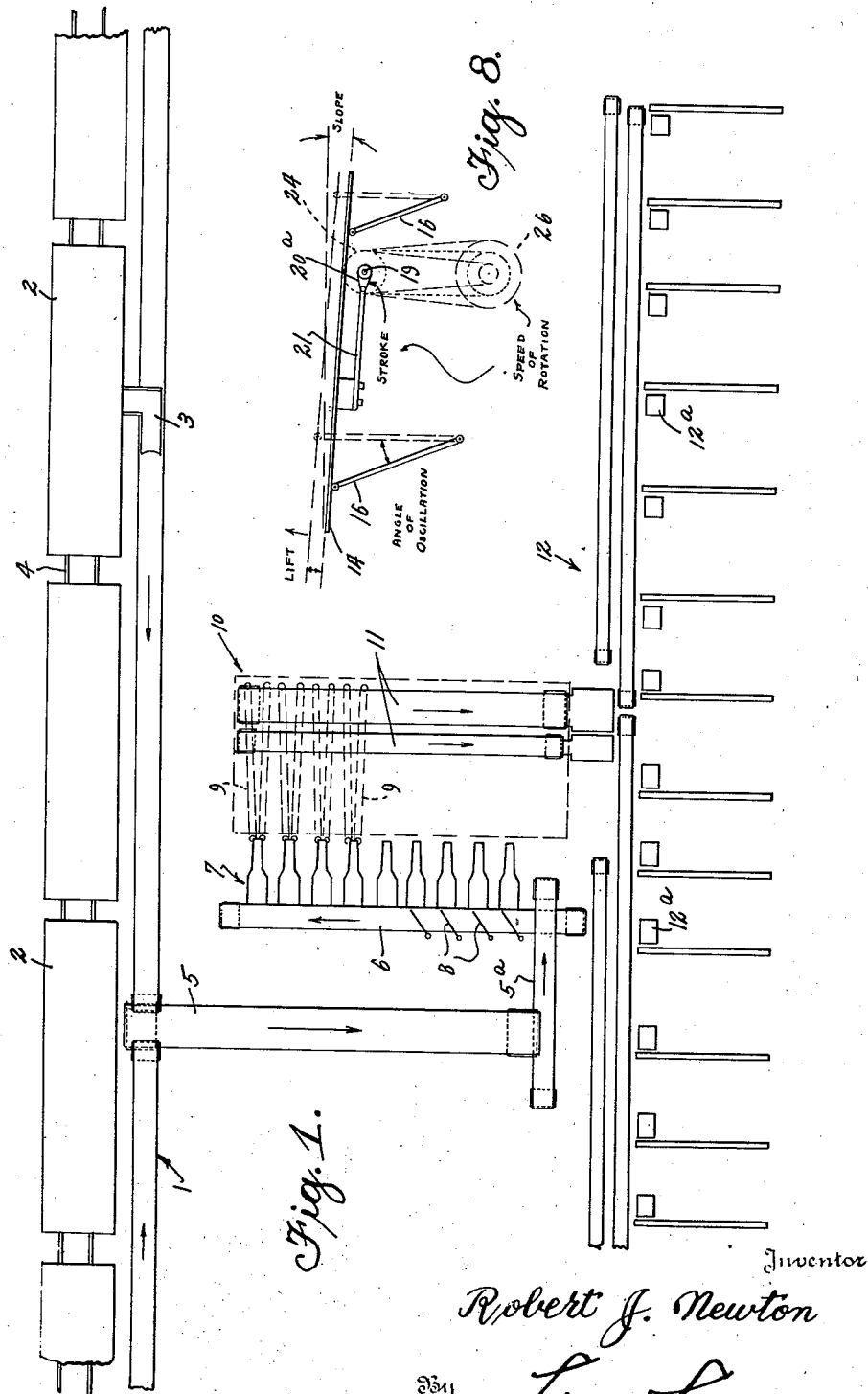
Inventor
Robert J. Newton
By Lyon & Lyon
Attorneys

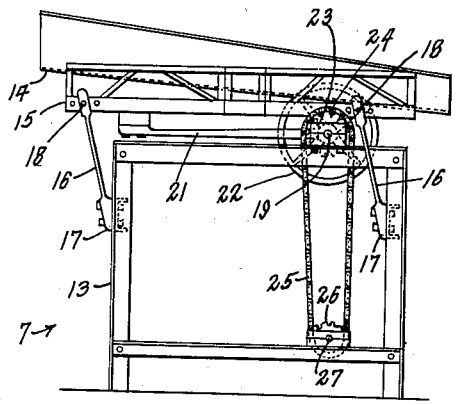
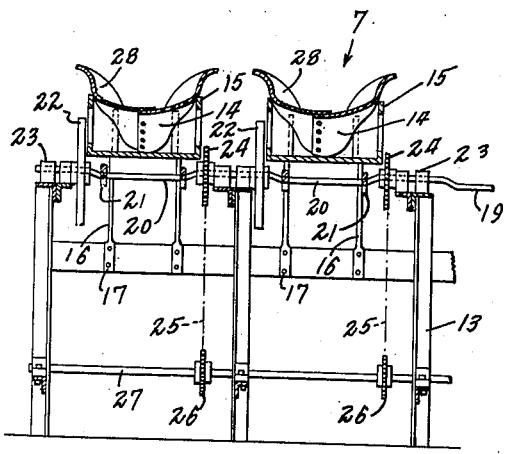
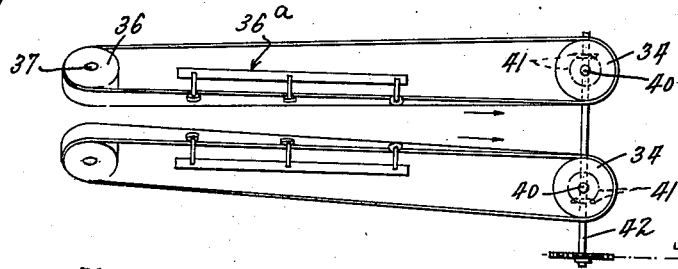

Patented Dec. 1, 1942

2,303,754

UNITED STATES PATENT OFFICE 2,303,754

PINEAPPLE SORTING APPARATUS

Robert J. Newton, Honolulu, Territory of Hawaii, assignor to California Packing Corporation, San Francisco, Calif., a corporation of New York Application December 20, 1939, Serial No. 310,159

7 Claims. (Cl. 198—30)

This invention relates to pineapple handling apparatus and more particularly to an apparatus for the handling of pineapples in order to segregate or grade the same.

In the handling of pineapples, it has heretofore been customary to rely almost entirely upon manual labor, particularly in the grading or segregation of pineapples and the delivery of the same to the peeling machines. These peeling machines are customarily designed so as to handle pineapples of a particular size. Therefore, a plant engaged in the preparation of pineapples for canning or the like will have a multiplicity of such peeling machines for the different sizes required for the preparation of pineapples for canning in the various sizes of cans. It has been necessary, before my present invention, to grade or segregate pineapples manually for feeding to these different pineapple peeling machines. The pineapple, because of its exterior, presents a particular problem of grading or segregation which has heretofore prevented the use of segregating or sizing apparatus.

Pineapples are usually graded to the required diameter or width because the pineapple as it is commonly canned, is canned in discs, the diameter of which is determined by the diameter of the can. Thus in order to avoid unnecessary fruit waste, it is essential to size the pineapple to the size most economically peeled or disked in the particular peeling machines related to the particular size or diameter of the can to be filled.

It is therefore an object of my invention to provide apparatus for the segregation, sizing and handling of pineapples in order that they may be properly graded, sized and delivered to the required pineapple peeling machines, commonly referred to as "ginacas".

It is a further object of this invention to provide a means for sizing pineapples, including a means operable for delivering the pineapple in end to end relation to the requisite sizing belts of a grading machine.

Another object of this invention is to provide an apparatus for the handling of pineapples so that the same may be moved in end to end relationship without danger of the said pineapples piling up or confusing the flow of pineapples in a single file end to end relation.

Other objects and advantages of this invention it is believed will be apparent from the following detailed description of a preferred embodiment thereof as illustrated in the accompanying drawings.

In the drawings:

Figure 1 is a general plan layout of the pineapple handling apparatus embodying my invention.

Figure 2 is a side elevation of a shaker table of pineapple feeding apparatus embodied in my invention.

Figure 3 is a top plan view of the shaker table as illustrated in Figure 2.

Figure 4 is a sectional end elevation taken substantially on the line 4—4 of Figure 3.

Figure 5 is a sectional end elevation of the shaker platform taken substantially on the line 5—5 of Figure 3.

Figure 6 is a sectional end elevation of the shaker platform taken substantially on the line 6—6 of Figure 3.

Figure 7 is a diagrammatic plan of the grader belt supporting the driving means embodied in my invention.

Figure 8 is a diagrammatic view of the pineapple feeding apparatus embodied in my invention.

The pineapple handling apparatus embodying my invention includes a track conveyer 1 of any suitable or desirable construction to which pineapples are delivered from the freight cars or trucks 2 through the medium of a suitable movable chute. The conveyer 1 is positioned adjacent the track or driveway 4 upon which the cars 2 are positioned, and leads toward a centrally disposed elevator 5 into which the pineapples conveyed by the conveyer 1 are delivered. The pineapples are elevated by the elevator 5 to a grader feed conveyer 6 which feeds a multiplicity of shaker tables 7. Any suitable form of delivery gates 8 may be utilized in conjunction with the conveyer 6 to control the rate at which the pineapples are delivered from the conveyer 6 to the respective shaker tables 7. The elevator 5 as herein illustrated also includes the end elevator 5ª to enable the pineapples to be elevated to the desired height in relation to the graders and the peeling machine feeding mechanisms.

The shaker tables 7 are means provided for segregating the pineapples as delivered from the conveyer 6 and positioning the same in single end to end file relationship so that they may be properly received between the conveyer or grader belts 9 of the grading units 10.

The graded pinapples from the grader units 10 are delivered to properly positioned conveyer belts 11 which convey the graded pineapples to the peeling machine conveyer 12. The pineapples are then conveyed to the peeling machines indicated at 12ᵃ adapted to receive the particular size of graded pineapple. Thus the entire operation of segregating, sizing and delivering the pineapples from conveyances or cars 2 to the proper size of peeling machine is performed automatically.

The shaking tables 7 are preferably constructed of a frame 13 upon which there is supported an inclined platform 14. The platform 14 is supported in a frame 15, and the frame 15 is secured to the frame 13 so as to permit reciprocation of the platform 14. Thus the frame 15 is secured to the frame 13 through the medium of a multiplicity of leaf spring members 16. The springs 16 are firmly fixed as indicated at 17 to the frame 13 and are connected through the medium of pivots 18 to the frame 15.

Means are provided for reciprocating the platform 14, which means preferably include a shaft 19 which may extend through the entire number of shaker tables 7 as indicated. The shaft 19 is provided with a crank portion 20 upon which there is suitably journaled a connecting rod 21. The connecting rod 21 is secured by suitable connecting pin to the frame 15.

Mounted upon the shaft 19 is a flywheel 22 provided for the purpose of maintaining substantially uniform action of reciprocation of the frame 15. The shaft 19 is suitably journaled in bearings 23 mounted on the frame 13. Means are provided for rotating the shaft 19, which means include a suitable sprocket 24 secured to the shaft 19 and connected through the medium of a chain or other transmission element 25 with a sprocket 26 secured to a driven shaft 27. The shaft 27 is driven from any suitable or desirable source (not indicated). Thus the platform 14 is reciprocated in an inclined plane, the direction of incline being forwardly in the direction of travel of the pineapples thereover causing the pineapples to move over the surface of the platform 14.

The platform 14 is at its entry end of sufficient width as to receive a multiplicity of pineapples from the conveyer 6.

The platform 14 has a throat section 28 where it uniformly converges to a throat 29 preceding the throat channel 30. The throat section 28 is relatively short in length and the platform at this point converges to a width at the throat 29 where the passage over the platform 14 is less than the combined diameter or width of two pineapples lying on the platform 14, but is greater than the width or diameter of a single pineapple so that the pineapple may freely pass without restriction to the throat 29 and hence along the throat channel 30. The throat channel 30, which is of relatively great length compared to the throat section 28, gradually converges in width to approximately the diameter or width of a single pineapple so that as the pineapple passes through the throat channel 30, its longitudinal axis is aligned with the center of the channel 30 and with the center of the conveyer groove formed between the spaced conveyer or grader belt 9 of the grader units 10.

In order to insure proper handling of the pineapples over the platform 14 and delivery of the same with their axes aligned with the center of the throat channel 30, the bottom of the platform 14 is formed as indicated of generally concave formation or with its lowest point in vertical alignment with the center throat channel 30.

Thus the platform 14 may be formed of two plates which are inclined toward the center 31. Thus the pineapple will tend to move toward the center of the platform 14.

In order to insure the delivery of the pineapples in single file relationship through the throat 29 and into the throat channel 30 in single file relationship, the throat section 28 is formed at its edges with a concave diverting wall 32 at the converging throat section. This concave section, more or less depending upon the size of the particular pineapple, conforms with the curvature of the pineapple. At the upper edge the concave walls 32 are formed convex as indicated at 33, and diverge outwardly from the throat channel 30. Thus when more than one pineapple reaches the throat section 28, the pineapples must separate to enter the throat 29 in single file relationship.

As the walls 33 diverge outwardly, space is provided permitting the pineapples to transversely move in the throat 30 so that under the influence of the reciprocation of the platform 14 and in the elongated throat channel 30 they soon find their way into single file advancing relationship, even under the urge of the oncoming fruit.

At the end of the throat 30 the pineapples are delivered between the grader belts 9 and are thereafter conveyed away from the throat channel under the influence of the driven grader belts 9. The grader belts 9 are spaced apart and mounted upon substantially horizontally disposed pulleys 34. A pulley 34 is provided for each continuous grader belt 9 and is driven.

In order to provide the grader trough 35 into which the pineapples are delivered from the throat channel 30, means are provided for inclining the grader belts 9, which means includes idler guide pulleys 36 mounted on inclined shafts 37. Guide members 36ᵃ are mounted to maintain the belts inclined to a suitable angle of approximately 45°. The grader belts 9 diverge from each other from the entrance end of the grader unit 10 to the other end thereof. Thus as is common in such grader constructions, the increasing distance between the grader belts 9 and the rate of divergence thereof determines the degree of grading of the fruit. The fruit, following between the grader belts 9 drops onto the respective conveyers 11 and is then delivered to the peeling machine elevators 12 as hereinabove stated. The grader belts 9 are driven by driven pulleys 34 secured to shafts 40 and driven through suitable gears 41 from a drive shaft 42.

In Figure 8 I have illustrated the relationship in the shaking table which, together with the contours and construction features as hereinabove set forth, enables me to deliver the pineapples to the grading belts in true axial position and in single file relationship. Thus in Figure 8 the variables are indicated as (a) The slope of the table, which is the forward inclination of the table. In order to obtain the most effective results, I have determined that this slope should be between the limits of three-quarter inches to three inches per foot of length of the table.

(b) The stroke which is the length of reciprocation of the table as is determined by the length of the crank arm 20ᵃ connecting between the shaft 19 and the arm 21. This stroke, or rather the length of the crank arm, i. e., the eccentricity of the crank, in order to obtain the most effective results, varies between one-quarter and one and one-half inches. Thus the total movement of the table is between one-half and three inches.

(c) A further variable is found in the lift which is the amount of rise of the table during each stroke of reciprocation. This lift is of course a function of the further variable;

(d) The angle of oscillation, that is, the angle of travel of the arms 16 during each stroke of reciprocation. The lift varies in order to maintain the most effective operation between a lift of ⅜ to 1⅜ inches. The variable $d$, that is, the angle of oscillation, and also to maintain the most favorable results of operation, may be varied between 4° 16′ to 12° 44′.

The fifth variable in this operation, (e) is the speed at which the shaft 19 is rotated, or the frequency of oscillation. Thus the speed of rotation of the shaft 19 to maintain the operation within the most effective range may be varied from 100 to 500 R. P. M.

It will be apparent from the foregoing that variations of one of these five variables may and does effect a variation of the other. For example, the throw of the eccentric will itself cause a variation in the angle of oscillation and the lift and as the arms 16 are increased, the angle of oscillation is changed and the lift will be decreased. As the slope is varied due either to a change in the throw of the eccentric or the angle at which it is set, it is found that the slope may be increased provided the lift is decreased. Thus as illustrative of the effect created by variation of the above set forth variables, I have found that when using a slope of ¾ inch per foot and with a one inch eccentric and with the angle of oscillation of 4° 16′, that by changing the speed of rotation of the shaft 19 from 380 R. P. M. to 400 R. P. M. there will be an increase of feed over the shaker table of between 30% and 40%. However, it will be apparent from the foregoing description of the shaker table embodied in my invention that as the speed of travel of pineapples over the table is increased that the tendency of the pineapples to jam in the throat 29 increases with resultant riding out of the pineapples over the convex surfaces 33 with consequent spilling out of the pineapples from the apparatus if clogging is to be avoided.

Having fully described my invention, it is to be understood that I do not wish to be limited to the details herein set forth, but my invention is of the full scope of the appended claims.

I claim:

1. In a pineapple handling apparatus, the combination of an inclined platform, means for delivering pineapples to said platform, said platform having a delivery throat including converging side members, said side members having concave sections narrowing to approximately the width of a pineapple, and said concave sections having at their upper edges pineapple-retaining side sections whereby pineapples tending to ride one above the others are retained in said throat, and means for reciprocating the said platform to advance the fruit therealong and to distribute the said pineapples in said throat in single file in end to end relation.

2. In a pineapple handling apparatus, the combination of an inclined platform, means for delivering pineapples to said platform said platform having a delivery throat including converging side members, said side members having concave sections narrowing to approximately the width of said pineapple, and said concave sections having at their upper edges pineapple-retaining convex side sections diverging outwardly whereby a pineapple tending to ride one above the other is retained in said throat, and means for reciprocating the said platform to advance the pineapples therealong and to distribute said pineapples in single file in end to end relation.

3. In a pineapple handling apparatus, the combination of an inclined platform having a bottom section of concave cross-section, said platform having a delivery throat including converging side members, said side members having concave sections narrowing to approximately the width of a pineapple, and said concave sections having at their upper edges pineapple-retaining convex side sections, and means for reciprocating said platform to advance the pineapples therealong and to distribute the said pineapples into said throat in single file in end to end relation.

4. In a pineapple handling apparatus, the combination of an inclined platform, means for delivering pineapples to said platform, said platform having a delivery throat including converging side members, said converging side members narrowing to a width less than the width of two pineapples but greater than the width of the single pineapple and being elongated from said point of convergence, and continuing to converge therefrom at a lesser rate of convergence to approximately the width of a single pineapple, and said converging side members having at their upper edges pineapple-retaining side sections, and means for reciprocating the said platform to advance the pineapple therealong and to distribute the pineapples in said throat in single file in end to end relation.

5. In a pineapple sorting apparatus, platform means adapted to be interposed between a delivery means for delivering pineapples to said platform means and a pair of spaced grader belts for receiving said pineapples in sigle file in end-to-end relation from said platform means, said platform means comprising a delivery throat member including converging side members having concave sections narrowing to approximately the width of a single pineapple and said concave side sections being formed at their upper edge with convex pineapple retaining side sections, and means for reciprocating the said delivery throat member to advance the pineapples therethrough and to distribute the same in single file end to end relation as the pineapples advance through said delivery throat member.

6. In a pineapple sorting apparatus, inclined platform means adapted to be interposed between a delivery means for delivering pineapples to said platform means and a pair of guided, diverging grader belts for receiving said pineapples in single file in end-to-end relation from said platform means, said platform means comprising a delivery throat including converging side members having concave sections narrowing to approximately the width of a single pineapple, and said concave sections being formed at their upper edge with convex pineapple retaining side sections, and means for reciprocating the said delivery throat means to advance the pineapples through the delivery throat and to distribute the same in end to end single file relationship prior to discharge of the pineapples from said delivery throat.

7. In a pineapple handling apparatus, the combination of an inclined platform having generally converging sidewalls extending from one end to the other and defining a pineapple receiving portion, an intermediate portion and a throat channel, the sidewalls defining said pineapple receiving portion being spaced apart a distance in excess of the width of two pineapples and gradually converging toward said intermediate portion, the sidewalls defining said intermediate portion converging relatively abruptly to a width less than the width of two pineapples but greater than the width of one pineapple, and the sidewalls defining said throat channel gradually converging from said intermediate portion to a width approximately equal to the width of a single pineapple, said throat channel being of a length greater than the length of a single pineapple, and means for reciprocating said platform to advance the pineapples therealong and through said throat channel to distribute the same in single file end-to-end relation.

ROBERT J. NEWTON.